United States Patent
Peters

(10) Patent No.: US 7,563,049 B2
(45) Date of Patent: Jul. 21, 2009

(54) FITTING FOR A VEHICLE SEAT

(75) Inventor: Christoph Peters, Wermelskirchen (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 12/077,542

(22) Filed: Mar. 20, 2008

(65) Prior Publication Data

US 2008/0175658 A1    Jul. 24, 2008

Related U.S. Application Data

(63) Continuation of application No. PCT/EP2006/007071, filed on Jul. 19, 2006.

(30) Foreign Application Priority Data

Sep. 30, 2005   (DE) .................. 10 2005 046 806

(51) Int. Cl.
   *F16C 11/00*   (2006.01)
(52) U.S. Cl. .................. 403/97; 403/93; 403/101; 297/369; 297/373
(58) Field of Classification Search ............ 403/93, 403/97, 101; 297/367, 369, 373
   See application file for complete search history.

(56) References Cited

U.S. PATENT DOCUMENTS

| | | | | |
|---|---|---|---|---|
| 4,143,905 | A * | 3/1979 | Hensel et al. | 296/65.17 |
| 5,590,931 | A * | 1/1997 | Fourrey et al. | 297/367 |
| 5,769,494 | A * | 6/1998 | Barrere et al. | 297/367 |
| 6,112,370 | A * | 9/2000 | Blanchard et al. | 297/367 |
| 6,149,235 | A * | 11/2000 | Fahim | 297/367 |
| 6,312,053 | B1 | 11/2001 | Magyar | |
| 6,629,733 | B2 * | 10/2003 | Matsuura et al. | 297/366 |
| 6,652,031 | B2 | 11/2003 | Villarroel | |
| 6,880,887 | B2 | 4/2005 | Hoshihara et al. | |
| 6,908,156 | B1 * | 6/2005 | Park et al. | 297/366 |

(Continued)

FOREIGN PATENT DOCUMENTS

DE    102 53 054 A1    6/2004

(Continued)

OTHER PUBLICATIONS

U.S. Appl. No. 12/077,558, filed Mar. 20, 2008; In re: Christoph Peters et al., entitled Fitting for a Vehicle Seat.

*Primary Examiner*—Michael P Ferguson
(74) *Attorney, Agent, or Firm*—Womble Carlyle Sandridge & Rice, PLLC

(57)   ABSTRACT

A fitting (5) for a vehicle seat, in particular a motor vehicle seat, comprises a first fitting part (7); a second fitting part (8) that can be rotated about an axis (A) relative to the first fitting part (7); a drivable eccentric (11; 111) that is mounted for rotating about the axis (A); and at least two locking elements (13) that are guided in the radial direction with respect to the axis (A) by the first fitting part (7), can be moved radially outward under the action of the eccentric (11; 111), and interact radially outward with the second fitting part (8) in order to lock the fitting (5). When the fitting (5) is in the locked state, at least one locking element (13) tilts in the counter direction in relation to the adjacent locking device (13).

20 Claims, 3 Drawing Sheets

U.S. PATENT DOCUMENTS

| | | |
|---|---|---|
| 6,991,294 B2 * | 1/2006 | Choi .................... 297/367 |
| 6,991,295 B2 | 1/2006 | Peters |
| 7,404,604 B2 | 7/2008 | Nag et al. |
| 2002/0096922 A1 | 7/2002 | Villaroel et al. |
| 2003/0025377 A1 | 2/2003 | Peters |
| 2003/0173810 A1 | 9/2003 | Lee et al. |
| 2004/0195889 A1 | 10/2004 | Secord |
| 2005/0052063 A1 | 3/2005 | Volker et al. |
| 2005/0127732 A1 | 6/2005 | Peters |
| 2006/0170269 A1 | 8/2006 | Oki |
| 2006/0261657 A1 | 11/2006 | Luo et al. |
| 2007/0137393 A1 | 6/2007 | Peters |

FOREIGN PATENT DOCUMENTS

| | | |
|---|---|---|
| EP | 1 225 086 A1 | 7/2002 |
| JP | 60-135338 | 7/1985 |
| JP | 2002-101997 | 4/2002 |
| WO | WO 02/058958 A1 | 8/2002 |
| WO | WO 2004/043733 A1 | 5/2004 |
| WO | WO 2005/023580 A1 | 3/2005 |

* cited by examiner

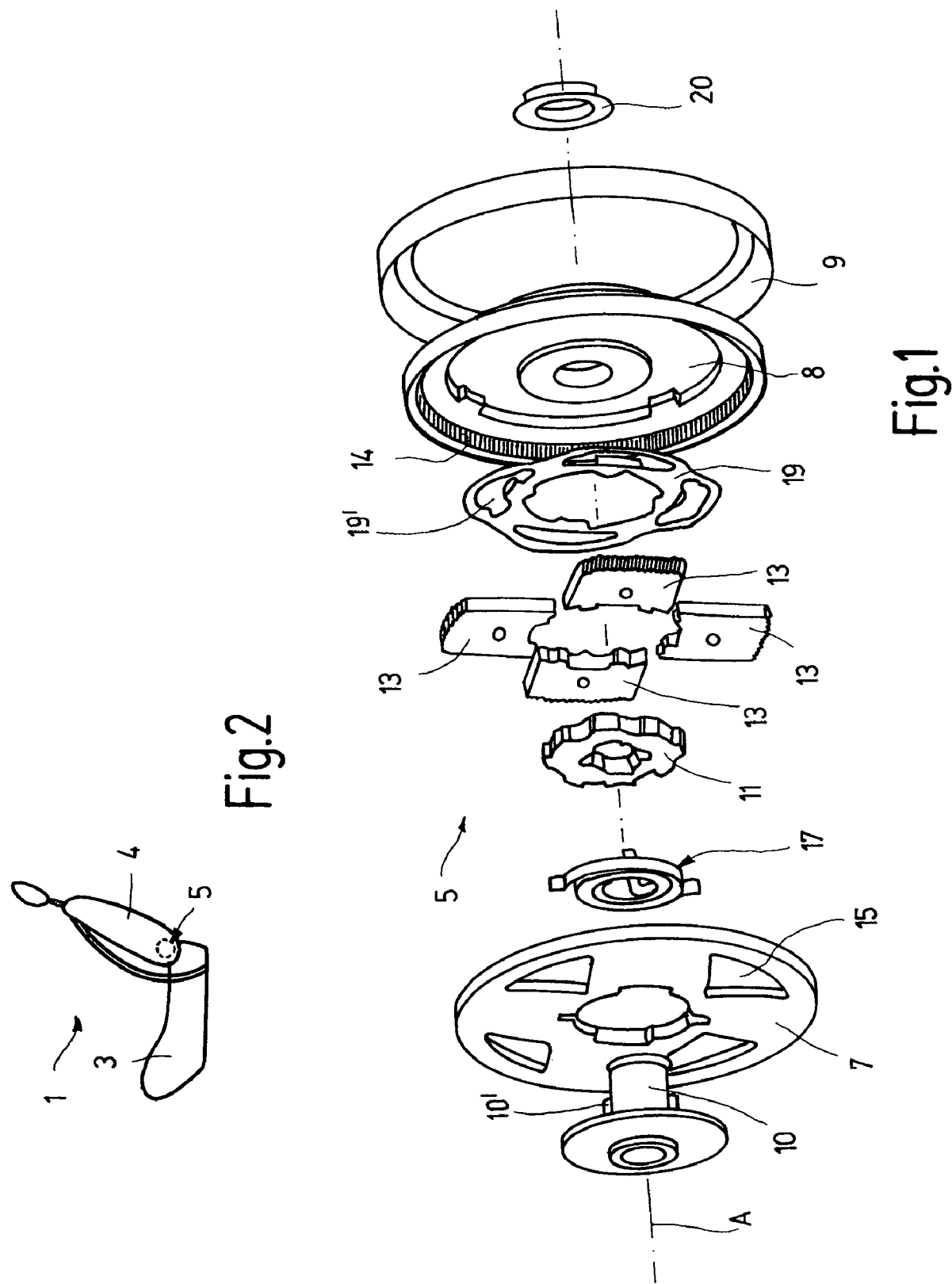

FITTING FOR A VEHICLE SEAT

CROSS-REFERENCE TO RELATED APPLICATION

The present application is a continuation of International Application PCT/EP2006/007071, which was filed Jul. 19, 2006. The entire disclosure of International Application PCT/EP2006/007071, which was filed Jul. 19, 2006, is incorporated herein by reference.

TECHNICAL FIELD

The present invention relates to a fitting for a vehicle seat, in particular a motor vehicle seat, with the fitting having a first fitting part; a second fitting part that can be rotated about an axis relative to the first fitting part; a drivable eccentric that is mounted for rotating about the axis; and locking elements that are guided in the radial direction with respect to the axis by the first fitting part, can be moved radially outward under the action of the eccentric, and interact radially outward with the second fitting part in order to lock the fitting.

BACKGROUND OF THE INVENTION

DE 102 53 054 A1 (which is a member of the same patent family as U.S. Pat. No. 6,991,295) discloses a fitting of the type described in the above Technical Field section of this disclosure. DE 102 53 054 A1 discloses that the two locking elements tilt laterally in the event of a crash in order, as far as possible, to maintain the tooth overlap between locking element and second fitting part.

BRIEF SUMMARY OF SOME ASPECTS OF THE INVENTION

One aspect of the present invention is the provision of improvements to a fitting of the type mentioned above. In accordance with one aspect of the present invention, a fitting for a vehicle seat, in particular a motor vehicle seat, includes first and second fitting parts mounted so that there can be relative rotation, about an axis, between the first and second fitting parts; an eccentric mounted for being rotated about the axis; and at least two locking elements that are guided by the first fitting part for moving radially outward, with respect to the axis, in response to rotation of the eccentric, so that the locking elements interact with the second fitting part in order to lock the fitting while the locking elements are positioned radially outwardly. The locking elements include a first locking element and a second locking element that are adjacent to one another. While the fitting is locked, the first and second locking elements are tilted laterally with respect to the radial direction, and the tilt of the first locking element is opposite from the tilt of the second locking element.

With an increased number of locking elements, the strength of the fitting against external loads, i.e. the capability of withstanding crash-induced malfunctions, can be increased. The fitting can therefore readily be used for belt-integral seats (i.e., seats with integral seat belts) with possibly particularly high loads. When the fitting is locked, the locking elements provided are normally tilted (i.e. apart from a crash situation and a possible misuse situation); therefore, the play present in the circumferential direction in the components involved in the fitting can be completely compensated for in the normal situation. Because of the fact that, normally, at least one locking element tilts in the opposite direction to an adjacent locking element, at least one locking element is tilted in one direction and a further locking element is tilted in the opposed direction. Irrespective of the loading direction, which results in a torque between the fitting parts, at least one locking element is already in a position in which it can immediately dissipate the forces from this load. The number of these locking elements is doubled if at least four locking elements are provided. Overall, the fitting according to the invention therefore provides both compensation of play and improved strength. A preferred, symmetrical arrangement with a simultaneously limited requirement for construction space arises if precisely four locking elements are provided, with the locking elements being arranged around the eccentric offset by 90° in each case, and of which the respectively opposite locking elements tilt in the same direction.

In order to bring about the tilting of the locking elements, the eccentric for each locking element has a first eccentric cam and a second eccentric cam which differ in design and together form a pair, with each locking element being assigned one pair. The first eccentric cams preferably protrude radially somewhat over (e.g., farther radially outward than) the second eccentric cams such that the first eccentric cams first of all come into contact with the locking elements, i.e. can act asymmetrically upon them. The sequence of the two eccentric cams within a pair preferably changes from pair to pair in the circumferential direction of the eccentric in order to produce the tilting movements in the opposite direction.

Preferably two locking cams are provided radially inward on each locking element and are respectively assigned an eccentric cam of a pair, so that a defined action upon the locking element by way of the eccentric cams is possible. Normally, the eccentric acts upon the locking element during movement radially outward and/or, when the fitting is locked, acts on the associated locking cam only by way of the first eccentric cam while there is a gap between the second eccentric cam and the locking cam assigned to it. In particular if arranged eccentrically, this already results (in a simple manner during the movement) in a tendency of the locking element to tilt and, during locking, in the necessary transverse force for the actual tilting. The compensation of play between the movable components involved can be obtained in a defined manner, for example, if, when the fitting is locked, each locking element is in contact with the other components at three points, in particular with the assigned first eccentric cam of the eccentric, a nearest adjacent guide segment of the first fitting part from the locking-element guide, and a toothed ring of the second fitting part, to which the locking element is locked.

In the event of a crash, if appropriate also in the event of misuse, the locking elements tilted in the loading direction are supported—if appropriate after deformation—and after overcoming the gap present before the loading, preferably with their two locking cams on the two assigned eccentrics. The force is in particular conducted into the second eccentric cam via the locking cam which was free up to now. In the event of a crash, the locking elements tilted counter to the loading direction tilt onto the other side and are supported directly, without further deformation, at least with one locking cam in each case on the assigned first eccentric cam. They thus make an increased contribution to the strength.

Other aspects and advantages of the present invention will become apparent from the following.

BRIEF DESCRIPTION OF THE DRAWINGS

The invention is explained in more detail below with reference to an exemplary embodiment illustrated in the drawings, together with a modification that is also illustrated in the drawings. In the drawings:

FIG. 1 shows an exploded illustration of the exemplary embodiment,

FIG. 2 shows a schematic illustration of a vehicle seat,

DETAILED DESCRIPTION

Figure 3:
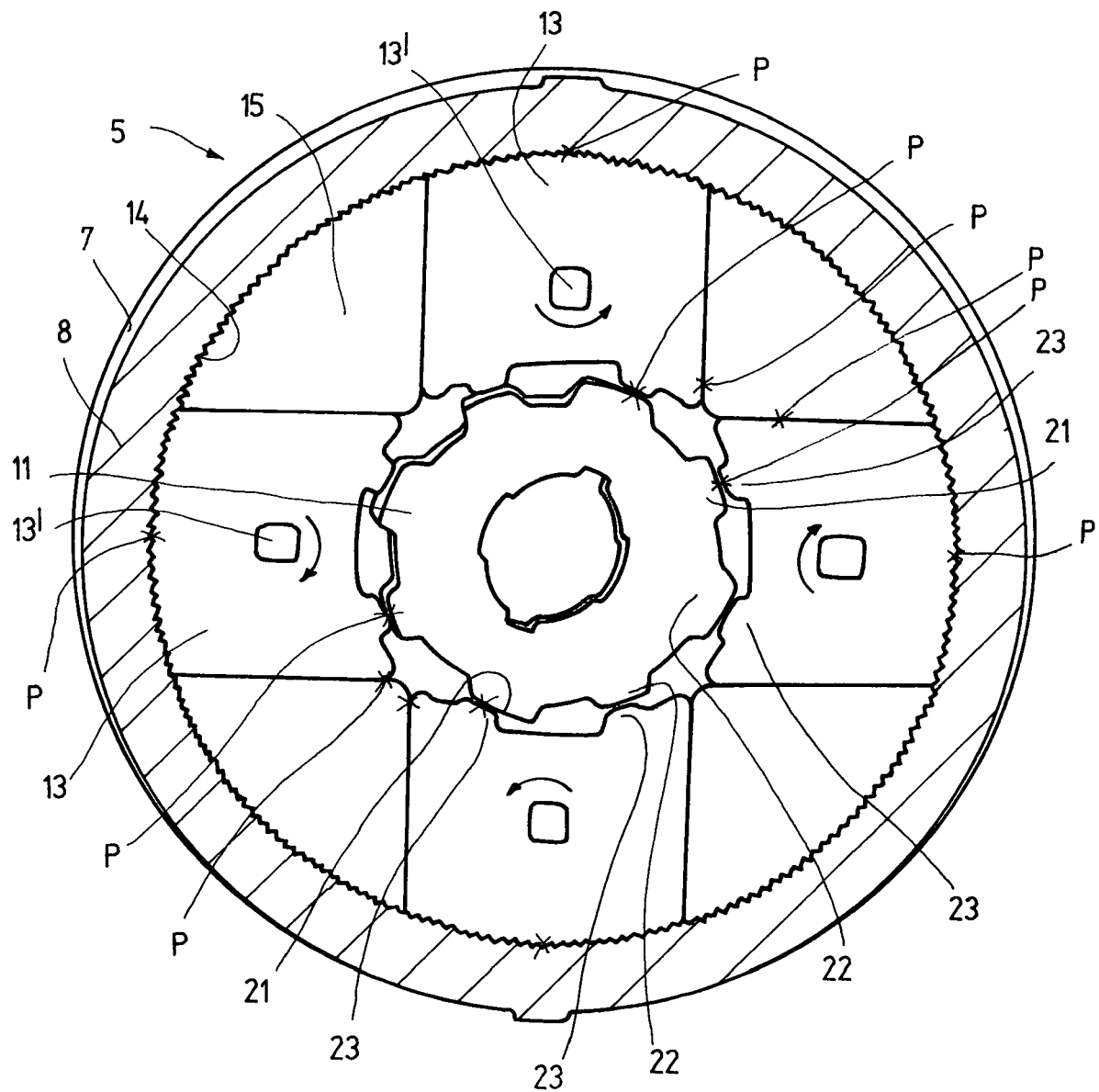
FIG. 3 shows a slightly perspectively illustrated section through the exemplary embodiment in a plane between the locking elements and the control disk.
Figure 4:
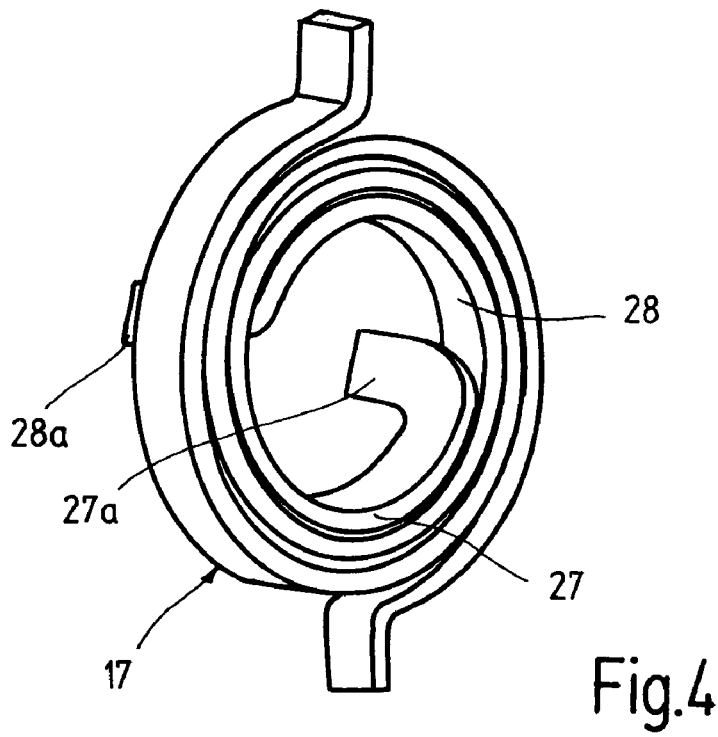
FIG. 4 shows a perspective view of the spring arrangement of the exemplary embodiment.
Figure 5:
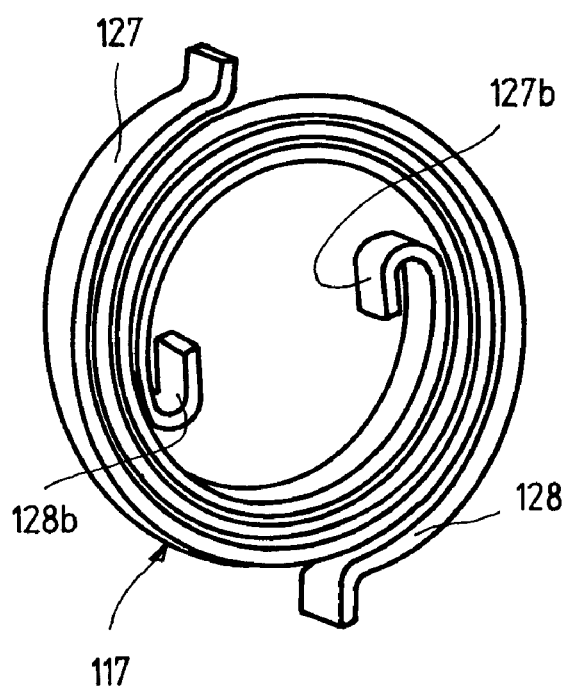
FIG. 5 shows a perspective view of the spring arrangement of the modification.
Figure 6:
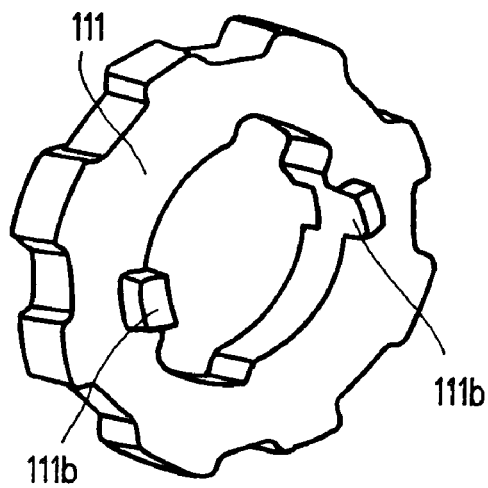
FIG. 6 shows a perspective view of the eccentric of the modification.

A vehicle seat 1 of a motor vehicle has a seat part 3 and a backrest 4. The backrest 4 is laterally attached to the seat part 3 by way of two fittings, so that the backrest 4 can be pivoted (e.g., inclined) relative to the seat part 3 and can be locked at different settings of the inclination. The orientation of the vehicle seat 1 in the motor vehicle and its customary direction of travel define the directional details used in this detailed description. The vehicle seat 1 is designed as a seat with an integral seat belt (i.e. the upper end of a seatbelt is fastened to the backrest 4, more specifically to an automatic belt device on the upper edge of the backrest 4). The forces introduced into the backrest 4 via the seatbelt in the event of loading can therefore be conducted on into the seat part 3 via the fittings, which is why at least the fitting 5 on the side of the vehicle seat which is subjected to a higher load and to which the seatbelt is attached is designed as a high-load fitting.

The fitting 5 is based on the same general principle as the fitting described in DE 102 53 054 A1 (which is a member of the same patent family as U.S. Pat. No. 6,991,295), the entire disclosure of which is expressly incorporated herein by reference. The fitting 5 is designed as a latching fitting in disk form. The fitting 5 has a first fitting part 7 and a second fitting part 8 which can be rotated about an axis A relative to the first fitting part 7. The fitting parts 7 and 8 define a construction space that is between the fitting parts 7 and 8. A clasping ring 9 annularly reaches over and engages the second fitting part 8 and is connected to the first fitting part 7, as a result of which the two fitting parts 7 and 8 are held together axially. In the exemplary embodiment, the first fitting part 7 is connected to the seat part 3, and the second fitting part 8 is connected to the backrest 4. However, the converse arrangement is also possible.

A driver 10 is arranged in the center of the fitting 5. The driver 10 is mounted on the second fitting part 8 in a manner such that the driver 10 is rotatable about the axis A that is arranged in the center of the fitting 5. An eccentric 11 that is arranged in the construction space is seated in a rotationally fixed manner on the driver 10, or the eccentric 11 is at least coupled to the driver 10 for being carried along by the driver. The eccentric 11 acts on four identical locking elements 13 that are arranged in the construction space around the eccentric 11. The locking elements 13 are offset by 90° with respect to one another. Each of the locking elements 13 is provided, on its radially outer side (with respect to the axis A), with a toothing in order to interact with a toothed ring 14 of the second fitting part 8, which is designed as an internal gearwheel. The locking elements 13 are guided in the radial direction by guide segments 15 of the first fitting part 7. The toothed ring 14 of the second fitting part 8 rests upon the four guide segments 15, as a result of which the second fitting part 8 is mounted on the first fitting part 7.

A spring arrangement 17 (described more specifically below) is arranged in a central opening (e.g., cutout) of the first fitting part 7 and acts upon the eccentric 11 such that the eccentric 11 presses the locking elements 13 radially outward, i.e. into the toothed ring 14; therefore, the fitting 5 is locked. A control disk 19 is arranged in the construction space axially between the locking elements 13 and the second fitting part 8. In the exemplary embodiment, the control disk 19 is seated in a rotationally fixed manner on the eccentric 11. The control disk 19 has four slotted guides 19', each of which interacts with a lug 13' of a respective one of the locking elements 13. The lugs 13' protrude in the axial direction from the locking elements 13. When the driver 10—and therefore the eccentric 11 and the control disk 19 driven thereby—is rotated counter to the force of the spring arrangement 17, the control disk 19 pulls the locking elements 13 radially inward, i.e. out of engagement with the toothed ring 14, and therefore the fitting 5 is unlocked.

The driver 10 is mounted in an opening of the second fitting part 8, with the driver 10 being mounted by way of a hub. Two integrally formed ribs 10' of the driver 10 bear in the axial direction against the inside of the second fitting part 8. A securing ring 20, which is arranged on the outside of the second fitting part 8, is fixedly seated on the hub of the driver 10. The securing ring 20 is clipped onto the hub of the driver 10 during assembly of the fitting 5, so that the driver 10 is axially secured.

During proper use, i.e. normally, a play necessary for the operation of the fitting 5 could lead to noise being generated. Therefore, provisions are made so that, when the fitting 5 is locked, the locking elements 13 can tilt—laterally with respect to the radial direction—even in the normal situation in order to compensate for the play (in particular in the circumferential direction). For this purpose, first eccentric cams 21 and second eccentric cams 22 are formed on the eccentric 11. The first eccentric cams 21 protrude radially somewhat over (e.g., radially farther outward than) the second eccentric cams 22. The four first eccentric cams 21 and the four second eccentric cams 22 form four pairs. As viewed in the circumferential direction of the eccentric 11, the sequence of the cams 21, 22 within a pair changes from pair to pair, i.e. two mutually adjacent first eccentric cams 21 are followed by two mutually adjacent second eccentric cams 22, and vice versa. Each pair is assigned precisely one locking element 13. Two locking cams 23—preferably of identical design—are arranged on each locking element 13, on the side facing the eccentric 11 and offset with respect to the radial center line of the locking element 13. For each of the locking elements 13, one of the locking cams 23 is aligned with a first eccentric cam 21, and the other locking cam 23 is assigned to a second eccentric cam 22.

When the eccentric 11 acts upon the locking elements 13, this normally means that only the first eccentric cam 21 in each case acts upon the locking cam 23 assigned to it, and therefore the locking element 13 moves radially outward while there is a gap between the second eccentric cam 22 in each case and the locking cam 23 assigned to it. As soon as the locking element 13 engages in the toothed ring 14, the locking element 13 tilts, i.e. rotates somewhat, in a direction indicated by a curved arrow in FIG. 3, until the play is compensated for. The locking element 13 then acts as a diagonal strut and is in contact at three points P with in each case one other component of the fitting 5, namely with the assigned first eccentric cam 21, i.e. the eccentric 1, the nearest adjacent guide segment 15, i.e. the first fitting part 7, and the toothed ring 14, i.e. the second fitting part 8. Because of the alternating sequence in the pairs of eccentric cams 21 and 22, the locking elements 13 tilt in an alternating direction, i.e. in each case in opposite directions to their respective neighbors. In each case, two mutually opposite locking elements 13 therefore tilt in the same direction which is in the opposite direction to that of the other two locking elements 13.

If a force is now exerted on the backrest 4, for example via the seatbelt, and in particular in the event of a crash, the second fitting part 8 experiences a torque. As a result, the second fitting part 8 exerts, by way of the toothed ring 14, a force in the circumferential direction on the four locking elements 13. For two locking elements 13, this force, i.e. load, acts in the direction in which they are tilted, and they therefore, firstly, can immediately conduct the force on and, secondly—if appropriate under elastic and/or plastic deformation—tilt somewhat further until the respective locking cam 23, which has been free up to now, comes into contact with the second eccentric cam 22, i.e. there is no longer a gap. However, the small movement of the locking elements 13 leads to slightly reduced strength. Upon a further increase in force, the force is now essentially conducted onto the eccentric 11 via the locking cam 23 which was free up to now. For the two other locking elements 13, the force, i.e. load, acts counter to the direction in which they are tilted. These two locking elements 13 therefore tilt counter to the original tilting direction and, in the process, conduct the force directly into the eccentric 11 via the respective first eccentric cam 21. In this case, these two locking elements 13 oppose the load with increased strength.

Because of the tilting normally of the locking elements 13 in the opposite direction, the same situation arises for a head-on crash and rear crash, i.e. the force flux passes in each case through a pair of locking elements 13 with two supported locking cams 23 (and, in the process, primarily via the previously free locking cam 23) and through a pair of locking elements, in which (furthermore) only one locking cam 23 is supported. The strength therefore significantly increases in total over an arrangement with just two locking elements, but also over an arrangement in which all of the locking elements tilt in the same direction, and therefore a loading direction would be opposed by lower strength.

For construction-space reasons, the spring arrangement 17 is arranged centrally in the first fitting part 7. If the spring arrangement 17 were to act on the eccentric 11 on one side, transverse forces would arise which would bring the eccentric 11 from its centered position into an asymmetrical position, which would cause a deterioration in its operation. In order to avoid this, the spring arrangement 17 comprises a first spring 27 and a second spring 28 which are each designed per se as a flat spiral spring. The two springs 27 and 28 are arranged rotated (e.g., rotationally offset) with respect to each other by 180° around the axis A and are nested one inside the other, i.e. the distances between the respective coils are selected to be of a size sufficient that a coil of the second spring 28 comes to lie between two coils of the first spring 27, and a coil of the first spring 28 comes to lie between two coils of the second spring 28, and there is also sufficient spring deflection in each case for contraction or expansion.

The two springs 27 and 28 are supported on the first fitting part 7 by way of their outer spring ends. The outer spring ends of the springs 27, 28 are angled radially and engage in a form-fitting manner in corresponding radial grooves of the central opening of the first fitting part 7. The radial grooves of the central opening of the first fitting part 7 are positioned radially opposite from one another. The action upon the eccentric 11 by the springs 27 and 28 takes place by way of the respective inner spring ends. In accordance with the exemplary embodiment, the inner spring ends are referred to, for the first spring 27, as first end finger 27a, and, for the second spring 28, as second end finger 28a. The two end fingers 27a and 28a are angled axially, since the eccentric 11 is arranged in an axially offset plane from the coils of the springs 27, 28. Also, the two end fingers 27a and 28a are arranged radially opposite each other. The end fingers 27a and 28a engage in correspondingly shaped, lateral cutouts of a central opening of the eccentric 11. The central opening of the eccentric 11 receives the driver 10, and the end fingers 27a and 28a end between the driver 10 and the eccentric 11. The symmetrical arrangement, supporting and acting upon the two springs 27 and 28 causes the transverse forces to be eliminated, and therefore the eccentric 11 as a whole is acted upon in a manner free from transverse force.

In a modification of the exemplary embodiment, a spring arrangement 117 has a first spring 127 and a second spring 128 which are likewise (i.e., in the same manner discussed above) nested one inside the other, but, instead of having end fingers, the first and second springs 127, 128 respectively have a first hook 127b and a second hook 128b, which are each curved radially inward. For action upon the eccentric 111, axially protruding fingers 111b are provided on the eccentric 111, and the two hooks 127b and 128b respectively engage around the fingers 111b. In all other features, the modification corresponds to the exemplary embodiment.

The springs 17 and 18 or 117 and 118 are also to be considered to be nested one inside the other if merely projections (of the springs) overlap one another in a plane that extends perpendicularly with respect to the axial direction, while the springs are arranged axially offset with respect to one another.

It will be understood by those skilled in the art that while the present invention has been discussed above primarily with reference to an exemplary embodiment, various additions, modifications and changes can be made thereto without departing from the spirit and scope of the invention as set forth in the claims.

That which is claimed:

1. A fitting for a vehicle seat, the fitting comprising:
first and second fitting parts mounted so that there can be relative rotation, about an axis, between the first and second fitting parts;
an eccentric mounted for being rotated about the axis relative to the first and second fitting parts;
a plurality of locking elements that are guided by the first fitting part for moving radially outward, with respect to the axis, in response to rotation of the eccentric, so that the locking elements engage an arrangement of teeth of the second fitting part to lock the fitting in a locked position while the locking elements are positioned radially outwardly, wherein:
the arrangement of teeth extends around, and is radially outwardly from, the axis,
relative rotation between the first and second fitting parts about the axis is restricted while the fitting is locked,
the plurality of locking elements includes first and second locking elements that are adjacent to one another, while the fitting is locked:
(a) the first and second locking elements are tilted laterally with respect to a radial direction that extends radially with respect to the axis, and
(b) the tilt of the first locking element is opposite from the tilt of the second locking element,
the eccentric includes:
(a) a first pair of eccentric cams for contacting the first locking element, and
(b) a second pair of eccentric cams for contacting the second locking element,
for each pair of the first and second pairs of eccentric cams:
(a) the pair includes a first eccentric cam and a second eccentric cam,
(b) the first eccentric cam differs in radial protrusiveness from the second eccentric cam, and
(c) the first and second eccentric cams are arranged in a sequence with respect to a circumferential direction of the eccentric,
for the first and second pairs of eccentric cams, the sequence of the two eccentric cams within a pair changes from pair to pair in the circumferential direction of the eccentric,
each of the first and second eccentric cams of the first pair of eccentric cams is for contacting the first locking element, and
each of the first and second eccentric cams of the second pair of eccentric cams is for contacting the second locking element, wherein when the eccentric is rotated to an unlocked position, the eccentric cams allow the locking elements to move radially inward and disengage the arrangement of teeth of the second fitting part, allowing rotation between the first and second fitting parts.

2. The fitting as claimed in claim 1, wherein:
the plurality of locking elements further includes third and fourth locking elements that are adjacent to one another,
the plurality of locking elements is arranged around the axis,
the first, second, third and fourth locking elements are respectively offset with respect to one another, and
while the fitting is locked:
(a) the third and fourth locking elements are tilted laterally with respect to the radial direction, and
(b) the tilt of the third locking element is opposite from the tilt of the fourth locking element.

3. The fitting as claimed in claim 2, wherein:
the plurality of locking elements consists essentially of the first, second, third and fourth locking elements; and
the plurality of locking elements is arranged around the eccentric;
the first, second, third and fourth locking elements are respectively offset by 90° with respect to one another so that:
(a) the first and third locking elements are opposite from one another and tilt in the same direction as one another, and
(b) the second and fourth locking elements are opposite from one another and tilt in the same direction as one another.

4. The fitting as claimed in claim 3, wherein:
the eccentric includes:
(a) a third pair of eccentric cams for contacting the third locking element, and
(b) a fourth pair of eccentric cams for contacting the fourth locking element; and for each pair of the third and fourth pairs of eccentric cams:
(a) the pair includes a first eccentric cam and a second eccentric cam, and
(b) the first eccentric cam protrudes farther radially outward than the second eccentric cam;
each of the first and second eccentric cams of the third pair of eccentric cams is for contacting the third locking element; and
each of the first and second eccentric cams of the fourth pair of eccentric cams is for contacting the fourth locking element.

5. The fitting as claimed in claim 2, wherein:
the first and fourth locking elements are adjacent to one another,
the second and third locking elements that are adjacent to one another, and while the fitting is locked:
(a) the tilt of the first locking element is opposite from the tilt of the fourth locking element, and
(b) the tilt of the second locking element is opposite from the tilt of the third locking element.

6. The fitting as claimed in claim 2, wherein:
the eccentric includes:
(a) a third pair of eccentric cams for contacting the third locking element, and
(b) a fourth pair of eccentric cams for contacting the fourth locking element;
for each pair of the third and fourth pairs of eccentric cams:
a) the pair includes a first eccentric cam and a second eccentric cam, and
(b) the first eccentric cam differs in radial protrusiveness from the second eccentric cam;
each of the first and second eccentric cams of the third pair of eccentric cams is for contacting the third locking element; and
each of the first and second eccentric cams of the fourth pair of eccentric cams is for contacting the fourth locking element.

7. The fitting as claimed in claim 6, wherein for each pair of the first, second, third and fourth pairs of eccentric cams, the first eccentric cam protrudes farther radially outward than the second eccentric cam.

8. The fitting as claimed in claim 6, wherein:
each of the first, second, third and fourth locking elements includes two radially inwardly oriented locking cams;
the locking cams of the first locking element are for respectively contacting the eccentric cams of the first pair of eccentric cams;
the locking cams of the second locking element are for respectively contacting the eccentric cams of the second pair of eccentric cams;
the locking cams of the third locking element are for respectively contacting the eccentric cams of the third pair of eccentric cams; and
the locking cams of the fourth locking element are for respectively contacting the eccentric cams of the fourth pair of eccentric cams.

9. The fitting as claimed in claim 1, wherein for each pair of the first and second pairs of eccentric cams, the first eccentric cam protrudes farther radially outward than the second eccentric cam.

10. The fitting as claimed in claim 1, wherein:
each of the first and second locking elements includes first and second locking cams that are radially inwardly oriented;
the first and second locking cams of the first locking element are for respectively contacting the first and second eccentric cams of the first pair of eccentric cams; and the first and second locking cams of the second locking element are for respectively contacting the first and second eccentric cams of the second pair of eccentric cams.

11. The fitting as claimed in claim 10, wherein:
in at least one state of the fitting, simultaneously;
   (a) the first eccentric cam of the first pair of eccentric cams is in contact with the first locking cam of the first locking element,
   (b) the second eccentric cam of the first pair of eccentric cams is not in contact with the second locking cam of the first locking element,
   (c) the first eccentric cam of the second pair of eccentric cams is in contact with the first locking cam of the second locking element, and
   (d) the second eccentric cam of the second pair of eccentric cams is not in contact with the second locking cam of the second locking element; and
the at least one state is selected from the group consisting of:
   (a) a state in which at least the first and second locking elements are moving radially outward, and
   (b) a state in which at least the first and second locking elements engage the arrangement of teeth of the second fitting part in order to lock the fitting.

12. The fitting as claimed in claim 11, wherein, when the fitting is locked, each locking element is in contact at three points with other components of the fitting.

13. The fitting as claimed in claim 12, wherein the three points of contact are:
a first point of contact with a respective first eccentric cam of the eccentric,
a second point of contact with a nearest adjacent guide segment of the first fitting part, and
a third point of contact at a toothed ring of the second fitting part.

14. The fitting as claimed in claim 10, wherein, in response to a crash, for each locking element tilted counter to a loading direction, the locking element is tilted in the loading direction and is supported at least with one locking cam on the respective first eccentric cam.

15. The fitting as claimed in claim 10, wherein in response to a crash, for each locking element tilted in a loading direction, each of the locking cams of the locking element are supported on the respective eccentric cams.

16. The fitting as claimed in claim 1, in combination with a vehicle seat, wherein:
the vehicle seat includes a seat part and a backrest; and
the backrest is attached to the seat part by way of at least the fitting so that the backrest can be pivoted relative to the seat part and can be locked at different inclinations with respect to the seat part.

17. A fitting for a vehicle seat, the fitting comprising:
first and second fitting parts mounted so that there can be relative rotation, about an axis, between the first and second fitting parts;
an eccentric mounted for being rotated about the axis relative to the first and second fitting parts;
a plurality of locking elements that are guided by the first fitting part for moving radially outward, with respect to the axis, in response to rotation of the eccentric, so that the locking elements engage an arrangement of teeth of the second fitting part to lock the fitting in a locked position while the locking elements are positioned radially outwardly, wherein:
the arrangement of teeth extends around, and is radially outwardly from, the axis,
relative rotation between the first and second fitting parts about the axis is restricted while the fitting is locked,
the plurality of locking elements includes first and second locking elements that are adjacent to one another,
while the fitting is locked:
   (a) the first and second locking elements are tilted laterally with respect to a radial direction that extends radially with respect to the axis, and
   (b) the tilt of the first locking element is opposite from the tilt of the second locking element,
the eccentric includes:
   (a) a first pair of eccentric cams for contacting the first locking element, and
   (b) a second pair of eccentric cams for contacting the second locking element,
for each pair of the first and second pairs of eccentric cams:
   (a) the pair includes a first eccentric cam and a second eccentric cam, and
   (b) the first eccentric earn differs in radical protrusiveness from the second eccentric cam,
each of the first and second locking elements includes first and second locking cams that are radially inwardly oriented,
the first and second locking cams of the first locking element are for respectively contacting the first and second eccentric cams of the first pair of eccentric cams,
the first and second locking cams of the second locking element are for respectively contacting the first and second eccentric cams of the second pair of eccentric cams, and
in response to a crash, for each locking element tilted in a loading direction, each of the locking cams of the locking element are supported on the respective eccentric cams, wherein when the eccentric is rotated to an unlocked position, the eccentric cams allow the locking elements to move radially inward and disengage the arrangement of teeth of the second fitting part, allowing rotation between the first and second fitting parts.

18. The fitting as claimed in claim 17, wherein:
for each pair of the first and second pairs of eccentric cams, the first and second eccentric cams are arranged in a sequence with respect to a circumferential direction of the eccentric; and
for the first and second pairs of eccentric cams, the sequence of the two eccentric cams within a pair changes from pair to pair in the circumferential direction of the eccentric.

19. A fitting for a vehicle seat, the fitting comprising:
first and second fitting parts mounted so that there can be relative rotation, about an axis, between the first and second fitting parts;
an eccentric mounted for being rotated about the axis relative to the first and second fitting parts;
a plurality of locking elements that are guided by the first fitting part for moving radially outward, with respect to the axis, in response to rotation of the eccentric, so that the locking elements engage an arrangement of teeth of the second fitting part to lock the fitting in a locked position while the locking elements are positioned radially outwardly, wherein:
the arrangement of teeth extends around, and is radially outwardly from, the axis,
relative rotation between the first and second fitting parts about the axis is restricted while the fitting is locked,
the plurality of locking elements includes first and second locking elements that are adjacent to one another, while the fitting is locked:
  (a) the first and second locking elements are tilted laterally with respect to a radial direction that extends radially with respect to the axis, and
  (b) the tilt of the first locking element is opposite from the tilt of the second locking element,
the eccentric includes:
  (a) a first pair of eccentric cams for contacting the first locking element, and
  (b) a second pair of eccentric cams for contacting the second locking element,
for each pair of the first and second pairs of eccentric cams, the pair includes a first eccentric cam and a second eccentric cam, and the first eccentric cam protrudes farther radially outward than the second eccentric cam,
each of the first and second eccentric cams of the first pair of eccentric cams is for contacting the first locking element,
each of the first and second eccentric cams of the second pair of eccentric cams is for contacting the second locking element,
for each pair of the first and second pairs of eccentric cams, the first and second eccentric cams are arranged in a sequence with respect to a circumferential direction of the eccentric, and
for the first and second pairs of eccentric cams, the sequence of the two eccentric cams within a pair changes from pair to pair in the circumferential direction of the eccentric, wherein when the eccentric is rotated to an unlocked position, the eccentric cams allow the locking elements to move radially inward and disengage the arrangement of teeth of the second fitting part, allowing rotation between the first and second fitting parts.

20. A fitting for a vehicle seat, the fitting comprising:
first and second fitting parts mounted so that there can be relative rotation, about an axis, between the first and second fitting parts;
an eccentric mounted for being rotated about the axis relative to the first and second fitting parts;
a plurality of locking elements that are guided by the first fitting part for moving radially outward, with respect to the axis, in response to rotation of the eccentric, so that the locking elements engage an arrangement of teeth of the second fitting part to lock the fitting in a locked position while the locking elements are positioned radially outwardly, wherein:
the arrangement of teeth extends around, and is radially outwardly from, the axis,
relative rotation between the first and second fitting parts about the axis is restricted while the fitting is locked,
the plurality of locking elements includes first and second locking elements that are adjacent to one another,
while the fitting is locked:
  (a) the first and second locking elements are tilted laterally with respect to a radial direction that extends radially with respect to the axis, and
  (b) the tilt of the first locking element is opposite from the tilt of the second locking element,
the plurality of locking elements further includes third and fourth locking elements that are adjacent to one another,
while the fitting is locked:
  (a) the third and fourth locking elements are tilted laterally with respect to the radial direction, and
  (b) the tilt of the third locking element is opposite from the tilt of the fourth locking element,
the plurality of locking elements is arranged around the axis,
the first, second, third and fourth locking elements are respectively offset with respect to one another,
the eccentric includes:
  (a) a first pair of eccentric cams for contacting the first locking element,
  (b) a second pair of eccentric cams for contacting the second locking element
  (c) a third pair of eccentric cams for contacting the third locking element, and
  (d) a fourth pair of eccentric cams for contacting the fourth locking element, for each pair of the first, second, third and fourth pairs of eccentric cams:
  (a) the pair includes a first eccentric cam and a second eccentric cam, and
  (b) the first eccentric cam differs in radial protrusiveness from the second eccentric cam,
each of the first and second eccentric cams of the first pair of eccentric cams is for contacting the first locking element,
each of the first and second eccentric cams of the second pair of eccentric cams is for contacting the second locking element,
each of the first and second eccentric cams of the third pair of eccentric cams is for contacting the third locking element,
each of the first and second eccentric cams of the fourth pair of eccentric cams is for contacting the fourth locking element,
for each pair of the first, second, third and fourth pairs of eccentric cams, the first and second eccentric cams are arranged in a sequence with respect to a circumferential direction of the eccentric, and
for the first, second, third and fourth pairs of eccentric cams, the sequence of the two eccentric cams within a pair changes from pair to pair in the circumferential direction of the eccentric, wherein when the eccentric is rotated to an unlocked position, the eccentric cams allow the locking elements to move radially inward and disengage the arrangement of teeth of the second fitting part, allowing rotation between the first and second fitting parts.

* * * * *